United States Patent
Treibach-Heck et al.

(10) Patent No.: US 7,426,486 B2
(45) Date of Patent: Sep. 16, 2008

(54) MULTI-PARTY REPORTING SYSTEM AND METHOD

(75) Inventors: Varda Treibach-Heck, Redwood City, CA (US); Bruce Johnson, Chatsworth, CA (US); Byron G. Caldwell, Los Angeles, CA (US); David Alan Gollom, Los Angeles, CA (US)

(73) Assignee: Call-Tell LLC, Redwood City, CA (US)

( * ) Notice: Subject to any disclaimer, the term of this patent is extended or adjusted under 35 U.S.C. 154(b) by 0 days.

(21) Appl. No.: 10/003,341

(22) Filed: Oct. 31, 2001

(65) Prior Publication Data

US 2003/0083966 A1    May 1, 2003

(51) Int. Cl.
 G06F 15/02  (2006.01)
(52) U.S. Cl. .............................. 705/32; 705/1; 358/1.13; 358/1.14; 358/1.15; 382/170; 382/182
(58) Field of Classification Search .................... 705/30, 705/32
See application file for complete search history.

(56) References Cited

U.S. PATENT DOCUMENTS

| | | | |
|---|---|---|---|
| 4,021,777 A | 5/1977 | Shepard | |
| 5,001,769 A | 3/1991 | Reid-Green et al. | |
| 5,231,663 A | 7/1993 | Earl et al. | |
| 5,235,654 A * | 8/1993 | Anderson et al. | 382/180 |
| 5,377,191 A * | 12/1994 | Farrell et al. | 370/401 |
| 5,416,849 A | 5/1995 | Huang | |
| 5,428,694 A * | 6/1995 | Betts et al. | 382/317 |

(Continued)

FOREIGN PATENT DOCUMENTS

GB    2255473 A    11/1992

(Continued)

OTHER PUBLICATIONS

White, Ron, How Computers Work, Millennium Ed. Que Corporation, Sep. 1999.*

(Continued)

*Primary Examiner*—F. Zeender
*Assistant Examiner*—Asfand M Sheikh
(74) *Attorney, Agent, or Firm*—Jeffrey Pearce (57) ABSTRACT

One or more parameters such as time is reported to a center using a form. The center then automatically extracts data from the form and converts it for storage and subsequent processing or review. The invention allows other parties, upon proper authentication, to annotate received data, to indicate acceptance or rejection of the reported data. Depending on the relationship of the various parties and business rules stored with the center, parties other than the sender and center may also download reported data for subsequent processing, even where they have different hardware and software platforms. The invention is particularly suitable for senders such as employees who need to submit time sheets, expense reports, and the like to an employer, or for automatic analysis of submitted inventory reports, product orders, etc. In one embodiment, the center acts as an automatic data collecting and reporting intermediary between the sender and an employment agency, on one hand, and between the agency and a client, on the other hand, where the sender is associated with the agency but performs tasks on behalf of the client.

5 Claims, 4 Drawing Sheets

U.S. PATENT DOCUMENTS

| | | | | |
|---|---|---|---|---|
| 5,459,657 | A | * | 10/1995 | Wynn et al. .................... 705/32 |
| 5,555,325 | A | * | 9/1996 | Burger ....................... 382/309 |
| 5,619,708 | A | * | 4/1997 | Ho ............................ 715/506 |
| 5,631,984 | A | * | 5/1997 | Graf et al. ................... 382/317 |
| 5,664,109 | A | * | 9/1997 | Johnson et al. ................. 705/2 |
| 5,717,867 | A | * | 2/1998 | Wynn et al. .................... 705/32 |
| 5,721,940 | A | | 2/1998 | Luther et al. |
| 5,729,741 | A | * | 3/1998 | Liaguno et al. .......... 707/104.1 |
| 5,758,341 | A | * | 5/1998 | Voss ............................ 707/10 |
| 5,784,562 | A | * | 7/1998 | Diener ....................... 709/217 |
| 5,784,635 | A | * | 7/1998 | McCallum .................. 712/32 |
| 5,809,167 | A | | 9/1998 | Al-Hussein |
| 5,832,100 | A | | 11/1998 | Lawton |
| 5,838,458 | A | | 11/1998 | Tsai |
| 5,878,405 | A | * | 3/1999 | Grant et al. .................... 705/39 |
| 5,943,137 | A | | 8/1999 | Larson et al. |
| 5,991,742 | A | * | 11/1999 | Tran ............................ 705/32 |
| 6,038,547 | A | * | 3/2000 | Casto .......................... 705/30 |
| 6,088,677 | A | * | 7/2000 | Spurgeon ....................... 705/4 |
| 6,185,514 | B1 | * | 2/2001 | Skinner et al. .............. 702/188 |
| 6,338,097 | B1 | * | 1/2002 | Krenzke et al. ............. 719/329 |
| 6,347,306 | B1 | * | 2/2002 | Swart .......................... 705/32 |
| 6,397,167 | B2 | * | 5/2002 | Skinner et al. .............. 702/183 |
| 6,397,194 | B1 | * | 5/2002 | Houvener et al. ............. 705/16 |
| 6,401,079 | B1 | * | 6/2002 | Kahn et al. ................... 705/30 |
| 6,411,938 | B1 | * | 6/2002 | Gates et al. ................... 705/30 |
| 6,504,470 | B2 | * | 1/2003 | Puchek et al. ............. 340/5.53 |
| 6,581,025 | B2 | * | 6/2003 | Lehman ...................... 702/178 |
| 6,751,650 | B1 | * | 6/2004 | Finch et al. ................. 709/203 |
| 6,764,013 | B2 | * | 7/2004 | Ben-Aissa ............ 235/472.01 |
| 6,778,703 | B1 | | 8/2004 | Zlotnick |
| 6,826,597 | B1 | * | 11/2004 | Lonnroth et al. ............ 709/207 |
| 6,829,588 | B1 | * | 12/2004 | Stoutenburg et al. .......... 705/30 |
| 6,961,555 | B1 | * | 11/2005 | Philyaw ....................... 455/403 |
| 7,080,325 | B2 | | 7/2006 | Treibach-Heck et al. |
| 7,212,301 | B2 | | 5/2007 | Treibach-Heck et al. |
| 7,296,221 | B1 | | 11/2007 | Treibach-Heck et al. |
| 2001/0034676 | A1 | * | 10/2001 | Vasic .......................... 705/30 |
| 2001/0044756 | A1 | * | 11/2001 | Watkins et al. ................ 705/26 |
| 2002/0075514 | A1 | * | 6/2002 | Wright et al. .............. 358/1.15 |
| 2002/0082987 | A1 | * | 6/2002 | Wilson ....................... 705/39 |
| 2003/0083966 | A1 | | 5/2003 | Treibach-Heck et al. |
| 2006/0224990 | A1 | | 10/2006 | Treibach-Heck et al. |
| 2006/0224995 | A1 | | 10/2006 | Treibach-Heck et al. |
| 2007/0206223 | A1 | | 9/2007 | Treibach-Heck et al. |

FOREIGN PATENT DOCUMENTS

GB  2255473 A  * 11/1992

OTHER PUBLICATIONS

Derfler, Frank J. et al. How Networks Work, Millennium Ed., Que Corporation, Jan. 2000.*
Gralla, Preston, How the Internet Works, Millennium Ed., Que Corporation, Aug. 1999.*
White, Ron, How Computers Work, 6th Ed., Que Corporation, Sep. 10, 2001.*
Gralla, Preston, How the Internet Works, 6th Ed., Que Corporation, Sep. 7, 2001.*
Muller, Nathan J., Desktop Encyclopedia of the Internet, Artech House, Inc., 1998.*
Borland's Paradox for Windows User's Guide, Borland International, Inc, 1984.*
Borland's ReportSmith for Windows User's Guide, Borland International, Inc, 1994.*
Riley, David D., Data Abstraction and Structure, An Introduction to Computer Science II, Boyd and Fraser Publishing Company, 1987.*
UpShot Online Admin Guide, from UpShot.com 1999.*
Timeslips Deluxe, Getting the Most from Timeslips, Timeslips Corporation, 1995.*
Bragg, Steven M., Accounting Best Practices, John Wiley and Sons, Inc., 1999.*
Suzanne Liebowitz Taylor et al., "Extraction of Data from Preprinted Forms", Machine Vision and Applications, Published 1992, vol. 5, p. 221-222, Paramax Systems Corporation, Valley Forge Research and Development.*
Suzanne Liebowitz Taylor et al., "Extraction of Data from Preprinted Forms", Machine Vision and Applications, Published 1992, vol. 5, p. 211-222, Paramax Systems Corporation, Valley Forge Labs Research and Development, 70 East Swedesford Road, Paoli, Pennsylvania.
I.L. Dijkstra et al IRIS An Image Recognition and Interpretation System for the Dutch Postbank. Pages 23-26 0-7695-0750-6/00 © 2000 IEEE.
David Monger et al An Interactive Document Image Description for OCR of Handwritten Forms. Pages 524-527 0-8186-4960-7/93 © 1993 IEEE.
Arturo Pizano et al A Business Form Recognition System. Pages 626-632 0730/3157/91/0000/0626 © 1991 IEEE.

* cited by examiner

MULTI-PARTY REPORTING SYSTEM AND METHOD

BACKGROUND OF THE INVENTION

1. Field of the Invention

This invention relates to a system and a method for reporting and tracking one or more parameters such as time or sales, or for placing orders, etc., especially where the person or organization that creates the report or order is remote from the person or organization that is to receive and process the report or order.

2. Description of the Related Art

Much of ones work life is tracked and measured. Time cards, time sheets, time clocks and time-tracking software, for example, are features of the modern workplace that are seemingly as unavoidable as the hierarchies that require them. Consequently, following a routine repeated daily by millions in almost every industrialized country, those whose time is to be reported complete a report such as some type of card or sheet or physical or on-screen form. The report is then passed to one or more other people, such as a payroll or billing clerk, a project manager, etc. The data on the report is then usually entered manually into some type of bookkeeping or similar tracking software.

This conventional process is, however, as rife with possibilities for error as it is widespread. For example, every time someone must enter information, be it numerical or textual or both, manually onto paper, there is the possibility of error, since someone else will usually later have to read and interpret what has been written. The likelihood of error is often lessened when using time cards that are punched by machine, but even then the chance of error is not eliminated, because as soon as the data on the card is entered manually into a tracking system, there is a risk of misinterpretation or simply just typing errors. Moreover, even if everyone in the chain of reporting were infallible, the process itself contains an unavoidable inefficiency whenever reported data must be reentered into a tracking system—the very need for data reentry requires both time and an employee to do the reentry.

One way to reduce the need for data reentry would of course be to have the employee enter data himself into the tracking system. The disadvantages of this are, however, plain. First, the employee may not be comfortable with or competent in using the time-tracking software, especially if the software is based on a web browser. Second, even assuming that every reporting employee has convenient access to a suitable computer terminal, it would be wasteful to load multiple copies of the time-tracking software into each terminal. The alternative of having several employees having to share a single instance of the software to report their time, for example, late on a Friday afternoon, would arguably be even worse.

As if the traditional scenario of a worker reporting time to an employer were not bad enough from the standpoint of inefficiency and probability of error, one increasingly prevalent aspect of modern employment compounds the problems even further, namely, the practice of hiring contract workers, who are frequently referred to as "contractors." In this arrangement, an employment agency places one or more contract workers with one or more client employers. The workers include legal employees of the agency, contract employees, or both, and are assigned to work at tasks for the clients. The workers are usually, but not necessarily, physically present at the place of business of the clients as they do their work. The clients then pay the agency for the services of the contract workers and the agency itself pays the workers. This arrangement is now found at almost all levels of both the manufacturing and service industries, for almost all types of employees, from day laborers at construction sites to highly skilled programmers at major software development companies. Indeed, even the task of recruiting new permanent employees is sometimes performed by contract employees.

The arrangement agency—contract employee—client is therefore closely analogous to the arrangement general contractor—sub-contractor—client used elsewhere. Indeed, in many cases, the contract employees are considered "sub-contractors," legally independent of the agency; in these cases, the agency may help the contractor find clients, it may handle the placement, and it may take care of certain administrative functions such as time-keeping, leaving the contractor responsible for paying for her own benefits, paying self-employment taxes, etc.

The addition of a third party—the agency—increases the complexity and likelihood of error not only of the time-tracking procedure, but usually also of the information that needs to be reported: The most immediately obvious complication is physical—the time reports in almost every instance must be sent from one facility, for example, the client's, to another, that is, the agency. Moreover, both the agency and the client will typically want to be able to access the time reports, often for different reasons. The client, for example, will typically want to be able to audit the reports as needed, whereas the agency must also have the data in a form suitable for its own purpose of paying reporting workers, be they employees or contractors. The client may, moreover, also want to be able to make sure the agency receives comments concerning the reporting worker, for example, concerning her performance.

Because an agency, especially a successful one, often contracts its employees out to many different clients, it is unlikely that all clients will have the same software that the agency prefers. Moreover, most clients will be loath to taking on the task of tracking time themselves, or to load into their own computers a software package provided by If paper forms are used to report time, then the contract employees must get them to the agency in some way. Requiring the employees to drop off the forms in person is inconvenient at best and at times impossible. Sending them by mail introduces delay and the risk of misplacement and loss. Even assuming no delay or loss, these solutions still require manual data entry, which itself leads to the drawbacks mentioned above.

Because the modern world is full of reports and orders, the problems identified above in the context of reporting time arise in other contexts as well, where other parameters than time must be reported instead of, or in addition to, time. For example, employees must often file expense and travel reports, or sales reports.

Moreover, parameters such as time and expenses are not the only types of information that frequently need to be reported. Employees or affiliates may need to file reports concerning the progress of projects, or the status of inventory, for example, or vendors may wish to send bills quickly in order to speed up the payment process.

Furthermore, similar problems occur even in contexts where the one reporting information is not in any way associated with the recipient of the report. This will often occur in the case of processing of customer orders. As is well known, one option offered by today's technology is on-line ordering via the Internet. However, not all companies have, or wish to have, a web site, and not all potential customers are comfortable with the thought of placing orders over such an insecure channel. Moreover, high-tech, on-line ordering and order processing are not always appropriate. For example, it would in most cases be too time-consuming and tedious to expect several co-workers in an office to have to go on-line and fill in browser-based forms simply to place advanced orders for lunch at one of their favorite restaurants.

What is needed is therefore a system for reporting information such as time worked, expenses, inventory, orders, etc., that is easy to use, that does not require the user to have specialized technology available, that allows for easy verification, that eliminates the need for manual data reentry, and that is readily adaptable to many different reporting contexts. The system should be flexible enough to handle three-party situations such as, for example, those involving contract workers or sub-contractors. This invention provides such a system, and a related method of operation.

SUMMARY OF THE INVENTION

The invention provides method and system implementation that enables one or more senders, such as remote employees or customers, to submit reports of at least one parameter such as time, quantity, etc., to a central system ("center"). Using a form processing module, the center automatically extracts report data from the report and stores the extracted report data in a memory, and, for at least one third party, it stores a set of party-specific rules in the memory. The received report is then associated with the corresponding third party. Via a publicly accessible transmission network, the center allows access by the third party to at least a selected portion of the extracted report data according to that third party's corresponding party-specific rules.

The center preferably includes a pull request processing module that allows transfer of a copy of the extracted report data to the third party via the network. The transferred data then resides at and is available for processing by the third party. In order for third parties operating different hardware platforms and processing software to receive and process extracted data from the same memory within the central system, the extracted report data is preferably stored in the memory in a predetermined common format. Before transferring the extracted data to any third party, a format conversion sub-module within the form processing module then converts the extracted data into a format specified by rules associated with that third party.

In the preferred embodiment of the invention, the form processing module receives and stores in the memory third-party indicated annotations associated with the extracted report data. Moreover, the form processing module preferably also receives, from the third party, a confirmation or rejection indication relating to at least a portion of the extracted, stored report data. If the third party rejects the data, then the center directs the sender to resubmit a corrected report.

An image of the report as received is preferably also stored in memory. Via the network, the third party can then access the image, whereby the third party is able to confirm the accuracy of the extracted report data.

At least one fourth party may also be associated with the sender and with at least one of the third parties. The fourth party can then contact the center via the network and access at least a selected portion of the extracted report data from the respective sender.

The invention is particularly advantageous in an contractor-agency-client relationship, whereby the fourth party is a client of the agency, the sender is a person referred by the agency to the client and performs work tasks for the client, and the at least one parameter is time worked by the sender on behalf of the client.

Reports may be purely electronic, such as an on-line browser input screen, or physical, such as paper. In the cases in which the report is a physical form, the central server includes devices and software modules, in particular, a form-processing application, for automatically receiving an electronic representation of an image of a physical form from any of a plurality of the senders, via a transmission channel such. The form preferably has a plurality of data fields, each corresponding to an indicator of at least a partial value of at least one of the parameters. Software modules are included within the form-processing application for automatically identifying the location of the data fields in the received representation of the image of the form; for automatically extracting from the identified data fields the at least partial values of the corresponding parameters; and for automatically storing the extracted values in a predetermined format in a memory. The location of the data fields in the received representation of the image of the form is then automatically identified and the values of the corresponding parameters are then automatically extracted from the identified data fields.

The invention also comprises a method of doing business according to which at least one party other than the report sender is charged for access to reported data.

DETAILED DESCRIPTION

Figure 1:
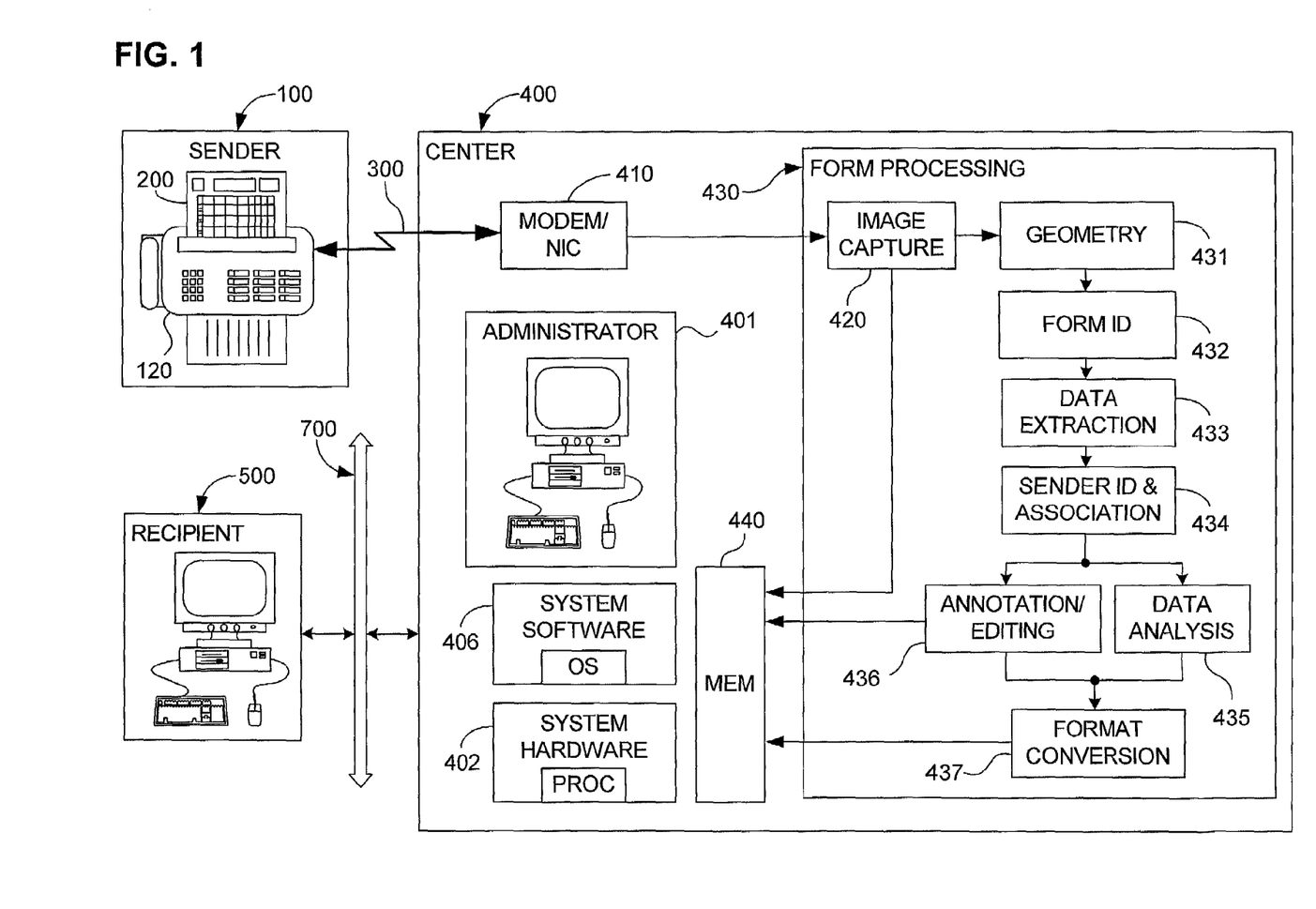
FIG. 1 is a block diagram that illustrates the main hardware and software components of a basic embodiment of the system according to the invention.

FIG. 1 is a block diagram of the main hardware and software components of a basic embodiment of the invention. In this embodiment, it is assumed that a sender 100 is to transmit some kind of report to a central system 400 ("central server" or simply "center"). The sender does this by recording the information to be reported on a form 200, which is then sent using a transmission device 120, via a channel 300 to the central system 400. Upon receiving the transmitted form, the center then processes it in order to extract the data from the form and, after optional further processing, store it in a data base. Before the individual hardware and software components of the invention are discussed in greater detail, these terms and concepts are first explained.

The sender 100 will be any person or group that needs to report information to the center 400. Note that this invention may be used with any number of senders. In the most commonly anticipated use of the invention, the sender will be an employee who needs to report time worked, or some other parameter such as travel expenses, a vacation request, sales, inventory, etc. or any combination of such parameters. The sender may, however, also be someone not directly associated with the center, such as a vendor submitting a bill or a customer submitting an order, such that the center acts as an intermediary.

The sender may obtain the form 200 in any of several ways. In the case in which the form is a conventional paper form, then the sender may, for example, simply pick up a copy from whatever site he intends to send from. Alternatively, the sender could, after proper identification, download and print out a copy from the center 400 itself; this arrangement would give the center greater control over which form is sent to each sender, and would allow inclusion of, for example, information that identifies or is intended specifically for the sender requesting the form and/or other parties interested in the reported information. According to multi-party aspect of the invention described below, however, the nature of the form is not essential and may also be an electronic (on-screen) form that is completed and submitted using conventional browser technology.

In the cases where the form is paper, the transmission device 120 is preferably a conventional facsimile ("fax") machine. There are several advantages to using a fax machine. First, whereas not all workplaces have convenient Internet connections, almost all have at least one fax machine. Second, almost every sender in the modern work environment will be familiar with the use and operation of a fax machine. Third, the channel 300 used by a fax machine is usually the public telephone network, which allows not only for a dedicated, point-to-point connection with the center 400, but also is generally more reliable than a non-dedicated network such as the Internet. Fourth, all modern fax machines provide an easily understood, immediate confirmation of successful transmission or of failure. Fifth, sending fax machines also usually transmit identifying information such as the telephone number from which they are transmitting. This makes it possible for recipients, such as the center 400, to identify the source of a transmission.

It would also be possible, however, to use the invention with other transmission devices than a fax machine and other connections than a telephone line. One possible alternative, for example, would be to use a conventional computer to which a scanner is connected. The sender could then scan in the completed form he wishes to send, then transmit the file in some predefined format to the center, for example as an attachment to electronic mail ("e-mail"), directly as a bit-mapped file using fax-modem software, etc. In this case, the transmission channel 300 could involve a network other than, or in addition to, the telephone system, such as the Internet or a dedicated network (an "intranet") within an enterprise. Note that a fax machine itself embodies a scanner, and as such acts primarily as a combination of a scanner and a modem. All that is required to use the invention is some device that allows a physical form to be converted into an electronic representation that can be transmitted to the center 400; moreover, the transmission channel 300 may be wired, such as a telephone line, or wireless.

The form 200 may, likewise, be of many different types. In the most common use of the invention, the form will be a conventional paper form (one or more sheets) on which the parameter to be reported is marked in some visible manner, along with optional associated information such as the sender's identification, signature, etc. In the multi-party embodiment of the invention, the parameter(s) to be reported should be amenable to quantification or itemization on a list. For example, time can be reported in hours and minutes; inventory can be reported by marking an item number and a quantity; orders can be reported by marking a box next to the name of the desired items, along with a quantity; performance can be itemized as "excellent," "good," "acceptable," "unacceptable," etc.

Handwritten or printed comments, on the other hand, or signatures, cannot be itemized or quantified as readily, if at all. As is discussed further below, however, the invention allows such information to be included as well, although it will typically not be processed in the same way as information that can be quantified or itemized.

The sender 100 will usually be remote from the center 400. Note that the term "remote" does not necessarily imply distance, but rather, in the context of this invention, simply that the form is converted into an electronic representation and is transmitted over some channel to the center in some way.

In the simple embodiment of the invention shown in FIG. 1, the center 400 is the recipient of the transmitted form 200. This would be the case, for example, where the center is in the payroll department of a large company and is used to process time sheets sent in by off-site employees. It would also be possible, however, for the center to act as an intermediary for other parties who are the ones primarily interested in the data extracted from the forms transmitted from different users. Extracted data can then be transmitted (according to a known schedule or in response to a request) to the other recipient parties in any conventional manner, for example in the form of a summary, a detailed report, one or more electronic files in a chosen formal, etc., or any combination of such methods. For example, FIG. 1 shows one recipient 500, which communicates with the center 400 in any conventional manner via a network 700 such as the Internet. The invention also provides a novel multi-party embodiment, however, that allows for not only efficient data collection and analysis as in the embodiment shown in FIG. 1, but also for convenient, automated transfer of such data to third parties. Parties to whom the center-collected data is transferred may then process this data in any way they see fit, from a simple review of a report to a full-scale analysis of the reported parameter (such as time worked) using other applications.

FIG. 1 also shows the preferred structure of the center 400, which may be configured as a conventional computer system controlled by a system administrator 401. As in other computer systems, the center 400 includes system hardware 402 with at least one processor (PROC), system software 406, such as an operating system (OS), device drivers, etc., and one or more memory devices 440, which may be any combination of high-speed, volatile devices such as RAM memory and mass storage devices such as disks.

The center also preferably includes a conventional network connection I/O device 410 such as a modem and/or network interface connector (NIC), depending on the type(s) of transmission channel(s) 300 used to send forms. As is well known, the connection device 410 serves as an interface between the channel 300 and the system hardware and software and transforms a data stream suitable for transmission over the channel into a corresponding data stream that can be processed within the center, and vice versa. The function of a modem and NIC is well known and is therefore not described further here.

In order to convert the transmitted form into data suitable for processing, the center 400 includes an image capture module 420. This module may be implemented with existing technology, and converts the data stream received by the modem/NIC component 410 into a file containing a digital representation of the image of the sent form. Known fax-server software performs this function, for example, by receiving a fax and converting it into an image file in any of several standard formats, such as TIF, GIF, JPEG, HTML, or a standard bit-map. All that is needed according to the invention is for an image of the transmitted form to be generated such that the various data fields of the form can be located and interpreted. As FIG. 1 illustrates, the output from the image capture module 420 is preferably stored directly in the memory 440 for later retrieval of the raw image as received from the sender.

As everyone who has ever received a fax knows, the faxing process often skews and warps the document faxed, and noise and inaccuracies often corrupt the image further. In addition, most modern fax machines deliberately compress the transmitted image in order to make room to add a header. In essence, a form 200 can be considered to consist of an outer boundary, within which information is made visible in different fields, that is, portions of the form. The faxing process can distort not only the outer boundary, but also the absolute and relative positions of the fields, as well as their shape. Before data can be extracted from the various fields of the form, it is therefore necessary to identify where the fields are.

The form processing module therefore includes a sub-module 431, which determines the geometry of the received form image. Any known registration algorithm may be used to perform this function, and there are several commercially available image analysis routines that are suitable for use in the invention. Many algorithms are known, for example, that locate certain predetermined geometric shapes such as rectangles.

Other algorithms are more general, and match a given image with one or more templates. This is the preferred algorithm in the invention, since it does not restrict the layout of the forms as much as simple shape-location routines. Typically, these algorithms compare the test image (in this case, the received image) with a template and then uses known mathematical techniques to find a match that is the "best" in some predetermined sense, which is usually the minimization of an "energy" or "cost" function. For example, if each image (the test image and the template) is represented as a matrix of picture elements ("pixels"), then the pixel matrices can be compared element-by-element, for example, by forming the absolute value of the difference in their gray-scale values. For binary, bit-mapped comparisons, a similar result can be obtained by performing a logical "NOT XOR" operation. The test image and template are then mathematically (usually through changing the indexing) translated, rotated, and, in the most advanced algorithms, warped (similar to a technique known as a "rubber sheet transformation"), relative to each other until the sum of the absolute difference values (either as is or squared) is a minimum.

These algorithms are mathematically similar to holding the form and the template up to a light on top of each other, and then, while looking through both, shifting them until they appear to "line up." In short, the geometry module 431 performs a registration of the received form image with one or more templates, which are prestored in memory. In order to aid registration, the forms may be provided with one or more registration markings. The process of registration can then often be speeded up by using the markings as guides. If several markings are provided at different locations over the surface of the forms, with known separations and orientations, then the markings may also be used to compute local "dewarping" factors that can be applied to the pixels in a region near the markings.

In the simplest case, there will be only one template that all transmitted forms correspond to. In some applications of the invention, however, there may be many different types of forms, for each of which there is a corresponding template. One way to determine which template is to be applied is to establish a different telephone number (or network address) for all senders who are using the same form; the telephone number to which the form is sent then also identifies the proper form template. Another, automatic method is to compare each received form image with all the templates, only one of which (presumably, the correct one) will minimize the differences with the form image. Yet another method would be to use the identification feature of modern fax machines: The standard transmission protocol of a fax usually includes the telephone or station numbers of the sending and receiving devices; if specific templates are associated with certain sending devices, then the number of each sending device 120 can be used to select the appropriate template. The form processing module 430 therefore includes a form identification sub-module 432 that implements any known routine, such as those described, to determine which form has been received from a sender. Note that the form identification sub-module may be eliminated if only one form is ever used, or it may be incorporated into other sub-modules.

Regardless of the chosen registration and form-identification routines, once the received form image has been registered with a template, the locations of the different data fields will be then also be known. The actual data contained in the different data fields can then be extracted, also using known technology, in a data extraction sub-module 433. Several methods for data extraction are known as "optical character recognition" (OCR), which typically recognizes alphanumeric symbols and converts them into corresponding ASCII (or equivalent) character sets; "intelligent character recognition" (ICR), which typically also attempts to recognize non-standard fonts and even handwriting; "optical mark recognition" (OMR), which determines whether a data field (such as a check box, rectangle, circle, etc.) is filled in or blank; and various combinations and variations of these basic concepts.

Once the data on the form has been located and extracted, it will normally need to be analyzed in one or more ways. The analysis will also often depend on which entity or entities are to be the ultimate recipients of the result of the analysis. For example, if the form is a time sheet, then the analysis may be different for exempt as opposed to non-exempt employees, that is, those for whom overtime must be paid and those who are on a fixed salary regardless of hours worked. Hours worked each day during a pay period will, for example, normally need to be summed, or hours worked for an entire period may need to be associated with different projects. The form processing module therefore includes a data analysis sub-module 435 that is programmed using normal techniques to perform whatever analysis is required in each case.

Depending on the circumstances, it may also be desirable to be able to add notes or otherwise edit the form data. A corresponding processing sub-module 436 may therefore be included to allow this. For example, if an employee is reporting time taken as vacation, and that employee has exceeded his available vacation time, then a notation to this effect may be made in the data file in order to flag this for a manager. As is discussed below, in the multi-party embodiment of the invention, one or more parties in addition to the sender may also wish to add notations or comments to form data, in particular, to data once it has already been stored in the memory 440, as is indicated in FIG. 1 by the direct connection between the sub-module 436 and the memory. In the multi-party embodiment of the invention, parties may contact the center 400 and, after authentication using a password, add notes to the file into which a form is converted. These notes may be textual, but preferably also include notes in the form of attached audio files, for example in the widely used ".wav" format.

Once a form's data has been extracted and analyzed as needed, it will normally need to be stored in a format suitable for later retrieval and further analysis and annotation. In the multi-party embodiment of the invention, different parties may request data storage in different formats. One party may, for example, want to be able to retrieve data into a spreadsheet such as Microsoft Excel whereas another may want to retrieve data in QuickBooks format. In order to allow the center to adapt to the needs of external parties, rather than forcing them to accept a formatting decision used in the center, the form processing module 430 according to the invention preferably includes a format conversion sub-module 437 that converts the data from whatever format is chosen to initially represent extracted data (preferably, a generic format) to any of one or more predefined formats before storing the data in memory 440. Alternatively, all data could be stored in memory in a format chosen to meet the needs or preferences of the center 400, in which case the format conversion sub-module could be invoked to reformat stored data only when it is to be exported to another party. Note that in the case where an external recipient (such as recipient 500 illustrated in FIG. 1) receives form data from the center via the Internet, this means that, once the sender transmits a form 200, preferably via fax, all processing is carried out automatically—with no need for manual data reentry or other human intervention—even to the point of transferring the data via the Internet for subsequent processing.

The sub-modules 431-437 may all be implemented using known programming techniques with conventional hardware support as needed in any given application.

Figure 2:
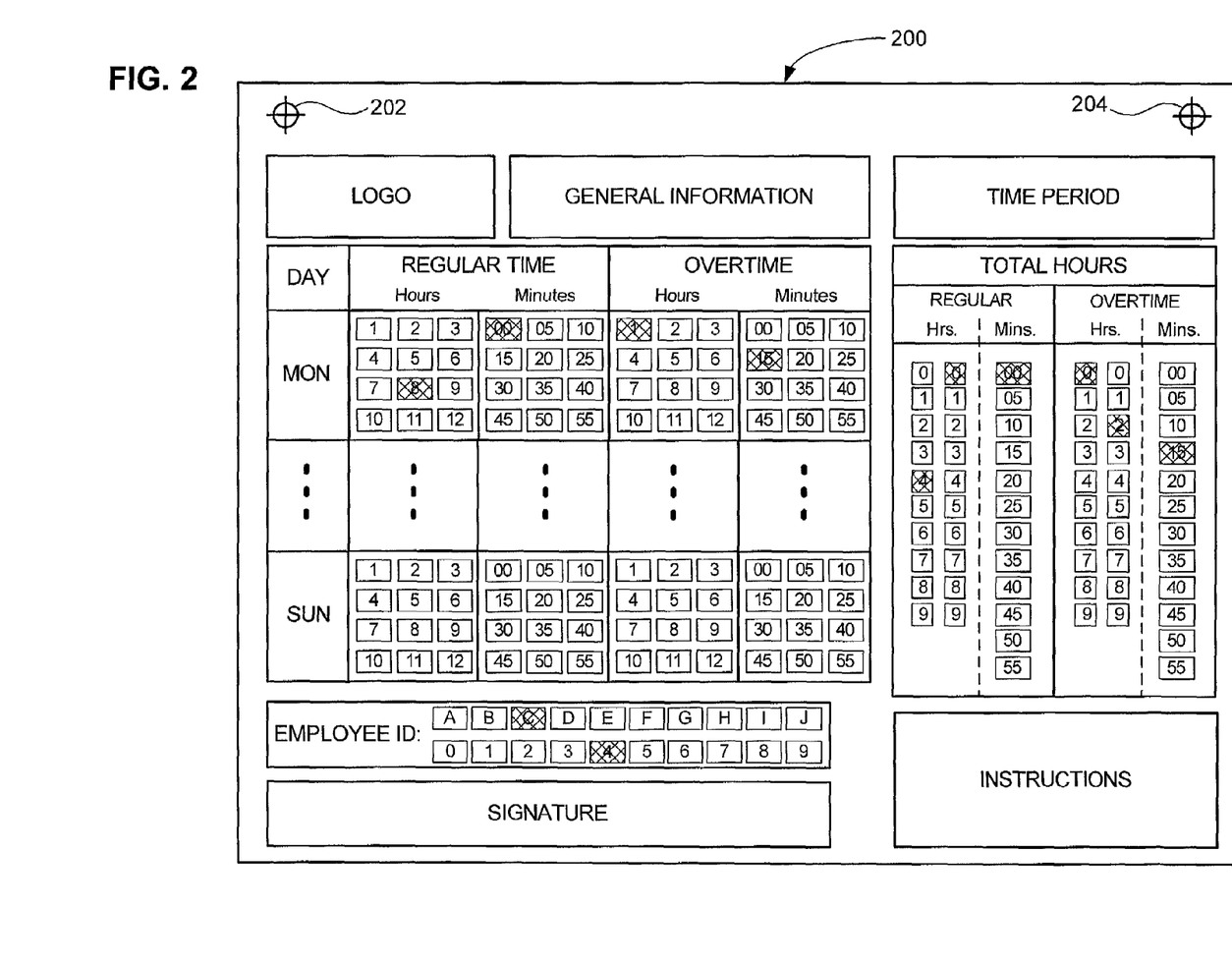
FIG. 2 illustrates one of the many types of forms that may be used to report information using the invention.

FIG. 2 illustrates one example of a possible form that could be used in the invention. In practice, of course, each user of the system will usually have unique requirements and specifications for the form(s) they will use. The invention is able to accommodate any forms that, as is mentioned above, have data fields in which possible values of parameters to be reported can be quantified or itemized.

The form example shown in FIG. 2, however, resembles in structure a form used successfully in tests of a prototype of the invention, in that it allowed for accurate data extraction when transmitted from several different conventional fax machines. As the various headings indicate, this example form is set up to enable reporting of time worked over the course of a seven-day week. In this example, hours worked each day are indicated on a row of entry fields, with columns for the day, as well as for the parameters "Regular Time" and "Overtime." For the sake of clarity, the data entry rows and columns are shown larger than they were on the test form used in the prototype of the invention. Moreover, the rows for data entry for the days Tuesday through Saturday have been omitted from FIG. 2, because of space constraints and again for the sake of clarity. The actual layout of the form will depend on the needs of the users; the invention does not require any particular layout or headings. Note, moreover, that a form may consist of more than one page.

The illustrated form includes several fields that are preferably pre-printed when the form is delivered to the sender (for example, at the beginning of a pay period for which he is to report time worked). Examples of such fields are fields for a logo, general information and instructions.

A field is also shown for the sender's signature. This will of course usually not be readable by any recognition software, but this is not necessary according to the invention. Rather, recall that an image of the sent form is preferably stored as is in the memory 440. If a user (either the administrator 401, or an external party such as a payroll clerk or manager at the sender's employer, etc.) later wishes to verify that the form was properly signed, then the user will be able to retrieve not only the analyzed data file, but also the original image, on which the signature will appear. This is of course also the case for any other visible feature of the form.

When using the illustrated form, the sender enters data by darkening small data "boxes," each of which is a corresponding data field. Thus, any amount of time can be indicated, in five minute increments, by darkening the appropriate boxes, for example, using a pencil or suitable pen or marker. The sender similarly indicates such information as what his employee ID number is. In FIG. 2, the sender has thus marked that he is employee C4 and that, on Monday, he worked exactly eight regular hours and one hour fifteen minutes of overtime. His weekly total was 40 regular hours and two hours fifteen minutes of overtime.

The illustrated form also shows a block "Time Period." This may be preprinted, or it, too, may be designed with data boxes that the sender can darken; this would allow copies of a single form to be used over many time periods.

The form shown in FIG. 2 also illustrates how registration marks, such as marks 202, 204, may be included on the form as aides to image registration and location of the data entry fields, that is, the data boxes. Another field (not shown) may also be included to identify the form and perhaps even the entity (for example, employer) associated with the report; for example, when the form is created and delivered to the user, a bar or other standard code that is easily decipherable by software could be included in a form field to aid form identification.

As part of the data extraction process performed by the sub-module 433, for example, the optical mark recognition, the form processing system according to the invention will sense which boxes the user has darkened. Because the form will have been registered with a template, the darkened boxes can be readily associated with the correct data values for the different parameters to be reported. The data analysis sub-module 435 may then also carry out such computations as calculating the total hours reported as worked, which can then be stored along with the other form data in memory. The calculated total can then be checked against the value the sender himself has entered. If the calculated sum does not match the sum the user entered in the "Total Hours" block, then an annotation to this effect can be made in the stored data file and the administrator can be notified that the form is invalid because of at least one identified error. The sender can then be instructed in any known manner to send a correctly completed form.

Tests have indicated that "boxes" such as those illustrated in FIG. 2, with the values shown within each respective box, were easy to use and understand, and could be recognized by software with very high reliability. Other types of data entry fields may of course be used instead. For entering time, for example, two small clock shapes labeled "hours" and "minutes" could be printed on the form; the sender could then draw hour and minute "hands" in the respective clock figures to indicate time. A single clock figure could be used instead, on which the user draws in both hour and minute "hands"; to aid in the distinction, an inner ring could be included to indicate the proper length of the hour hand, the outer ring of the clock indicating the proper length of the minute hand.

As yet another alternative for entering numerical data such as how many of a particular item the sender wishes to order (or report), the form could include data entry boxes for units, tens, hundreds, etc. Each box could then include light, dotted or dashed lines oriented to correspond to the segments of a conventional seven-segment display. By darkening the appropriate segments, the sender can "print" the numbers in an unambiguous, handwriting-independent manner. Such data entry boxes have been used successfully for many years for automatic optical reading of postal codes on mailed envelopes in several Eastern European countries.

Figure 3:
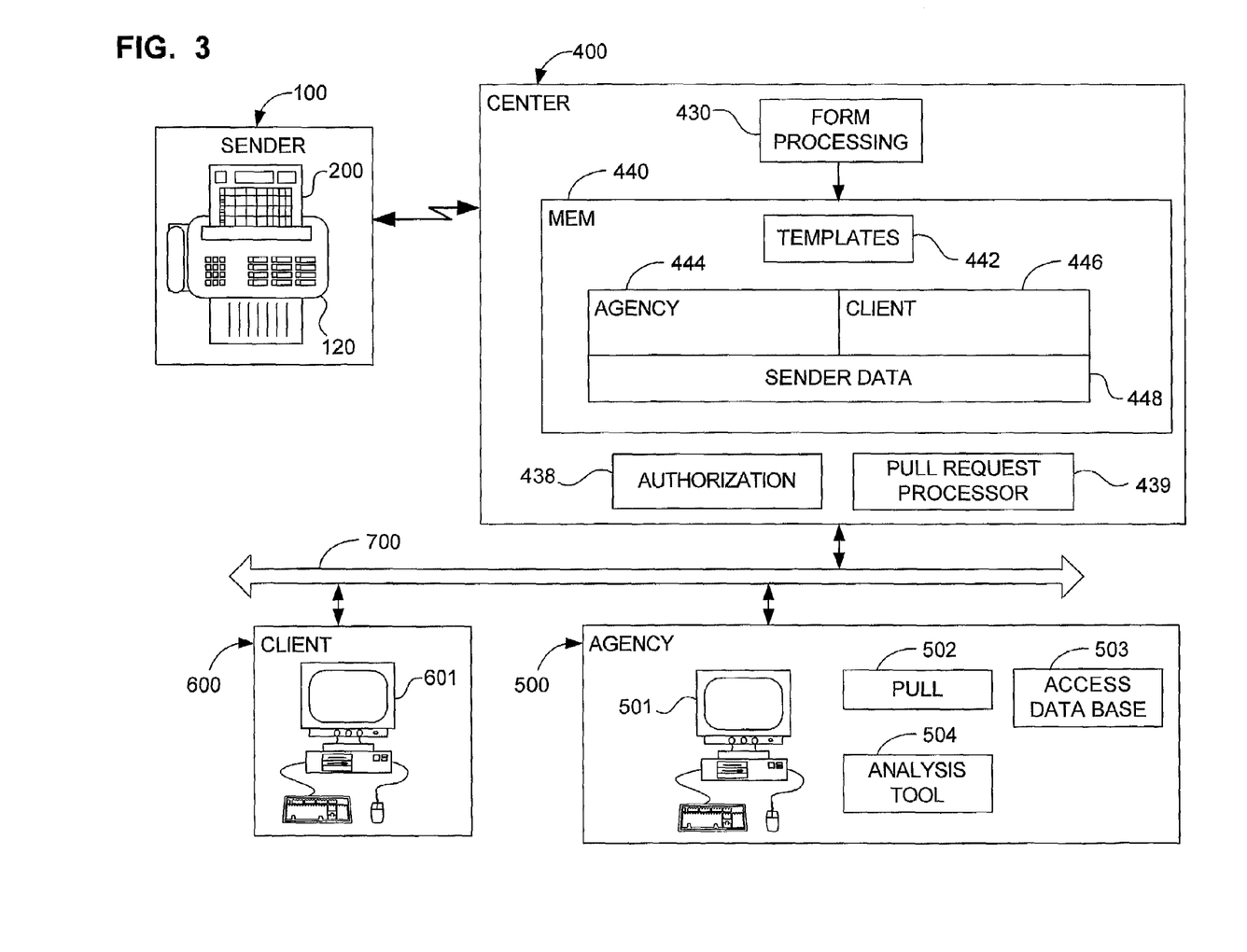
FIG. 3 is a block diagram of a multi-party embodiment of the invention, in which the main components of the invention are implemented in a central system that acts as an intermediary receiving and processing center for reported information in a three-party configuration.
Figure 4:
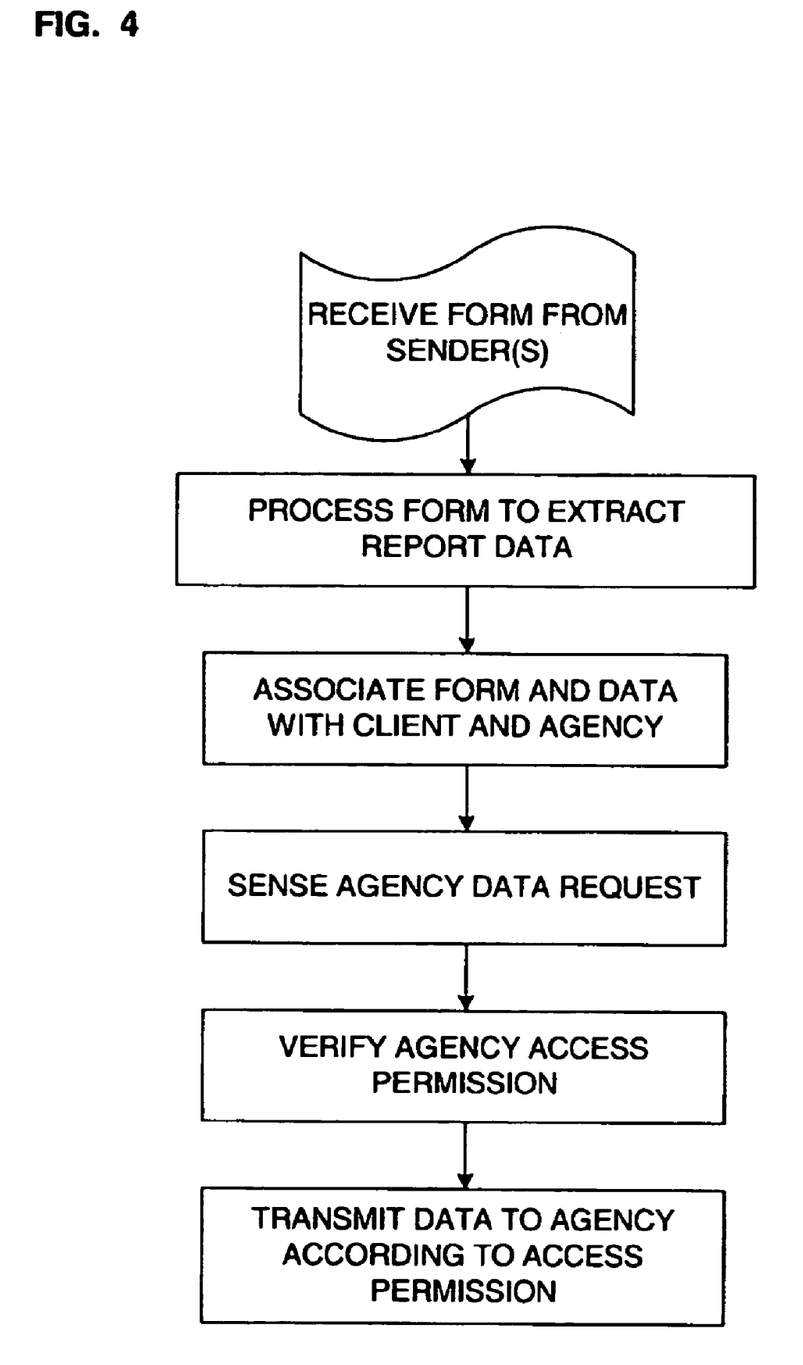
FIG. 4 is a flowchart that illustrates the main method steps implemented by a multi-party embodiment of the invention to enable information extracted from a sent for to be transmitted to a requesting agency.

FIG. 3 illustrates the multi-party embodiment of the invention, in which the sender 100 is a contractor who is formally employed by an agency 500 (who, in this embodiment, constitutes the primary intended recipient of reported form data), but performs work at the site of or for a client 600, who pays the agency for the services of the contractor. The premise of this example is that the contractor/sender 100 is to report the time he has worked in such a way that not only the agency will see the report, but also so that the client will be able to ensure correct billing, among other possible tasks such as making comments. Recall that this is but one possible scenario of a multi-party configuration according to the invention. One alternative already mentioned is where the agency is a general contractor and the sender is a sub-contractor. FIG. 4 is a flowchart that illustrates how the agency may access at least certain allowed portions of the information submitted by a sender. The various illustrated steps are described below.

In the example illustrated in FIG. 3, there is one sender, one agency and one client. This is done merely for the sake of simplicity and ease of understanding. In most practical applications of the invention, there may be several agencies each placing a large number of contractors with many different clients, and there may be a significant degree of overlap. For example, large companies often having working for them contractors from different agencies, and a single contractor might work part-time for each of two or more clients. Where such confusion is possible, each form that the sender sends should be associated with the proper agency and client, or the form should in some way be designed to allow for reporting of time (or other parameter) on a per client basis.

In this multi-party embodiment of the invention, the center 400 acts as an intermediary between the senders on the one hand and the agencies and clients on the other hand. Senders thus send completed forms to the center, for example, by faxing them. The multi-party configuration of the invention may work with other reporting media as well, however. For example, those wishing to report time (and/or any other parameter(s)) could enter the information directly using an on-line form, displayed, for example by a browser, which is then transmitted to the center in the conventional manner.

Other alternative reporting media include telephone dial-in, in which the user follows recorded instructions and makes data entries by pressing the keys of the telephone. All of these reporting methods may be done wirelessly as well, for example using telephone-to-network interface technologies such as WAP. Users could also be issued cards (such as a Swipecard or smart card) that has limited storage capacity and possibly even limited on-board processing power. As long as the system from which the user wishes to contact the center 400 is equipped with an appropriate reader, then he could access the proper dial-in connection, URL, etc., as well as transmit data such as his ID, etc., all automatically.

Regardless of how the sender transmits data to the center, each received form is then processed as described above, so that its data and preferably also a copy of an image of the form are stored in the memory 440. Each agency and, preferably, also each client can then contact the center from their respective local computer systems 501, 601, via the network 700, for example a publicly accessible network such as the Internet, in order to view the data reported by one or more senders.

The memory 440 preferably contains any conventional data structure in which information concerning the agencies, clients and potential senders is stored and related. Accordingly, in FIG. 3, the memory 440 is shown as having memory portions 444, 446, and 448 allocated for storage of at least one file or entry containing information for each agency, client and sender, respectively, who are participating in using the services of the center 400.

Any type of data may be stored relating to the agencies, clients and contractor/senders participating in the system made possible by the center. Note that all of the data stored in the center concerning an agency, its contractors, and the clients for which the contractors work, can be conveniently stored as a conventional relational data base. The data sent on a given form should, however, preferably be accessible row by row, or column by column, or even element by element, just as in a conventional spreadsheet. Any known data structure may be used to store sent data in this way.

When the center receives a form, it should be possible to identify the sender, the agency with which the sender is associated, and preferably also the client for which the sender has been working. This can be done in several ways by the sub-module 434 (Sender ID & Association) shown in FIG. 1. For example, as is mentioned above, the telephone number of the fax machine from which a form is sent may itself suffice to identify the client, which in turn may be enough to identify the agency. Since each agency will typically have its own form layout, the process of form identification will also identify which agency's form has been sent, since the template that best matches a transmitted form may be associated with a particular agency. To make agency identification easier, an identifier for the agency can therefore be included on all forms sent by employees of that agency. If a "Logo" field is included on the form, as in FIG. 2, then the logo could be an agency identifier; alternatively, a code such as a bar code could be included on the form that identifies the agency. Existing routines may then be incorporated into the "Form ID" or "Data Extraction" sub-modules 433, 434 to interpret the logo or bar code.

In many cases, it will not be necessary for the system to determine from the form itself which client the form relates to. For example, if each contractor is employed by only a single agency, and works for only one client, then identifying the sender will suffice to identify both the client and the agency. If positive client identification is required on the form itself, then any suitable identifying marking may be included on the form and interpreted as for agency markings. In most cases, the sender will be sending forms from the client's own facility, so that the transmission device 120 will typically be the client's. As is mentioned above, the center 400 may then be able to determine the identity of the client from the telephone number from which the form was sent. Especially in the case where the center is to be receiving reports sent from large clients who hire many contractors, it would also be possible for the center to have several different incoming telephone lines and then assign a dedicated telephone number to each participating client—all senders reporting time worked for each client would then fax the report form to the telephone number assigned to that client. All forms received on that number would then by definition be associated with an identifiable client.

The agency portion 444 of the memory preferably stores not only the identifier (and password) of the agency, but also rules that govern communications between the agency and the center. One such rule would be the format in which the agency prefers to receive data. Similar data may be stored concerning the clients.

Each sender, agency and client is preferably assigned a password and has a privilege level. The center 400 therefore preferably also includes an authorization module 438 that checks the ID and entered password of any entity that is contacting the center to determine which information stored in the memory is to be made available to it. In general, for example, an agency will be allowed full access to all data relating to or sent by its contractors, as well as full rights to make annotations. Clients, on the other hand, may be restricted to viewing and annotating forms sent by contractors it has hired. Contractors may be given the privilege to make changes to submitted forms, in which case the form processing system preferably flags for the agency that a change has been made or attempted.

The agency 500 (and possibly also the client 600) may wish to be able to approve or reject a submitted report before downloading its data and processing it according to its own work flow routines. In the preferred embodiment of the invention, the agency 500 therefore preferably contacts the center 400, for example, the pull request processor 439, and view either the extracted form data or its original image, or both, and then issue either a confirmation or rejection indication (for example, using conventional browser-based data input), which can then be stored along with the form data. If the agency rejects the data, for example because reported data is outside of a permissible range, or a signature is missing, then the center can send (for example, an automatically generated fax message, or a call by a human operator, etc.) directing the sender to resubmit a corrected report.

Note that the data analysis sub-module 435 may also often catch errors automatically. Such errors could be "intuitive," such as a failure to correctly sum daily hours worked for a week, can be detected using conventional algorithms. Yet another intuitive and automatically detectable error would, for example, be failure to properly darken a data box (assuming a faxed report), or entering contradictory information. Other errors may be defined by the agency, with suitable definitions stored as part of that agency's rules. For example, if an employee is not authorized to work as many overtime hours as he has reported, then the report should be flagged as being either in error or at least non-standard. The error can then be indicated either to the sender, along with a request for resubmission of a corrected report, or to the agency, or both.

It is preferably possible for contractors (senders) as well as clients and agencies to be able to communicate with the center via the network 700. In this case, each will need to have access to a computer system in which is loaded the necessary browser or analogous interface software. One advantage of this is that contractors, upon entry of a valid identification and password, can then request a download of forms that they can use as above to report parameters such as time. Note that each form will generally correspond to a template that will be stored in the memory 440. Before transmitting the form (for example in PDF or a standard word-processing format) that the contractor can then print out locally and fill in at the appropriate time, the form processing module 430 preferably automatically fills in (if not already included) such information as the agency and/or client identifier, a logo, any updated instructions that the agency may have sent for inclusion on the form, etc.

Before transmitting the requested form to the contractor, the center could also, for example, automatically fill in the dates of the reporting period and arrange the rows of the form accordingly. This has the advantage that it will often eliminate one source of potential error. For example, if a pay period for some reason begins on a Wednesday, or runs for some non-standard number of days, then the sender might accidentally mark the wrong first day on the form when making his time report. If the first row of the form is for Wednesday, however, then there is less probability of marking the form incorrectly. Suitable markings on the form itself, or indications in the user's file, should then be made to identify that the form has a "non-standard" layout so as to avoid ambiguity. Of course, weeks could simply always be printed in a standard order (Sunday to Saturday, or Monday to Sunday, for example).

One advantage of the invention is that it is flexible enough to accommodate almost any user desires concerning form layout as long as a template is made available to the system for proper registration and data extraction.

Similarly, if the form is an order form, then the center, after editing by the agency (which would then be a retailer, for example) could make sure not to include on the form items not currently offered, or could include an annotation informing the form requester of special offers.

FIG. 3 illustrates another advantageous feature of the invention, namely, the ability of the agency 500 to pull into its local computer system 501 the data accumulated in the center for its affiliated contractors. The agency therefore preferably includes conventional "pull" software 502, which cooperates via the network 700 with a pull request processing module 439 in the center 400 in order to transfer designated data files. One significant advantage of this arrangement is that the agency may then always be sure of having a full set of "its" data, which it may then store and process in any way it chooses regardless of the center, clients, or contractors.

Note that the invention makes it possible for any number of contractors or other senders to submit forms, whose data is extracted and made available or actually transferred over the network to another party (such as the agency) completely automatically, with no need for any reentry of data. Moreover, whereas some prior art reporting systems use a web server as the communication channel over which parameters are reported, for example by filling in and then submitting an on-screen reporting form, the invention preferably uses the network only as an intermediate communication tool—actual data can be reported using, for example, a fax machine and a conventional telephone connection.

As is mentioned above, sender data is preferably stored either in a generic format, or in a format specified as part of the agency's rules. Once the data is transferred to the agency, it is therefore preferably already in a form suitable for importation into an analysis tool 504 such as Excel, Quick Books, etc. Preferably, the center also makes the requested data available for viewing by the agency, for example using a conventional browser, so that the agency can specify exactly which data it wishes to pull into its local computer system.

Assuming either an "always on" network connection between the agency and the center, or an agreed-upon connection schedule, it would also be possible for the center to automatically transfer to the agency all data files associated with it, or all changes made to the files made since the previous transfer, or some other agency-specified subset of the stored data. The transfer schedule may be included as one of the rules stored for the agency.

This cooperation between the agency and the center allows the agency to take control of its data. In order to enable the agency to receive its data, for example, on a regular basis, the invention preferably includes various dedicated components. One of these components is the pull module 502 itself, which runs on the agency's computer system (shown in FIG. 3 as the computer 501). The main function of this module is to make a request for data from the center 400 and to update a database 503 located with the agency system.

There are two types of data requests that can be made. The first is for a full data load, which involves transferring all of the data for the agency that has not been purged. The second type is for an incremental data update. This will collect all of the changes that have been made since the last data update and transfer just that data to the agency's database. Incremental updating may be preferable where there is a large amount of data associated with the agency and the agency has a low-bandwidth Internet connection.

There are a number of elements to this feature in the multi-party embodiment of the invention. These elements include a configuration screen, a data requestor, and a data processor, which may be included as components of the pull module 502 and programmed using known techniques.

The configuration screen, which may be part of the pull request processing module 439, is a standard form that is used to define the parameters associated with the pull service. Included in the data that is collected may be the pull interval (how frequently the data is pulled), the data request type (full or incremental) and any other information necessary for the pull service. As well, it may be possible to schedule the pull interval using elements of the system software module 406 or other third party applications. By specifying the pull interval, the agency will be able to set up multiple schedules so that a full data load can be done, for example, on a weekly basis, with interim incremental data load updates, for example, on a daily basis.

The data requestor is a program that makes the appropriate request to a pull request processing module 439 in the center based on the information in the agency's configuration. As well, it will receive the response to the data request and route it to a data processor. Once the data requester has received the requested information from the center, the data processor converts the data into the desired form for storage in the access database. This includes creating the database, if required, and adding or updating data.

Unless the agencies themselves, and/or the clients, own and control the central server 400 (the "center"), the owner of the central server will typically charge the participants (agencies and clients) a fee for its use. Any or all of several different fee structures are possible, and they may be combined and tailored to individual agencies and clients. In the simplest case, each agency and client is charged a flat periodic fee. As one alternative, participants can be charged for each data access or transfer, or be charged a fee based on the amount of storage space required for a given agency's data, etc.

We claim:

1. A data collection and reporting method comprising, in a central computer system,
    automatically, that is, independent of any required human intervention:
        i) receiving, directly from a device for converting a physical form into a transmittable, electronic representation of the physical form, over a transmission channel, the electronic representation of the physical form, which embodies a report concerning at least one parameter from at least one sender, the form having a plurality of data fields, each corresponding to an indicator of at least a partial value of at least one of the parameters;
        ii) identifying the location of the data fields in the received electronic representation of the form; and
        iii) both extracting report data from the report and storing the extracted report data in a predetermined common format in a memory for subsequent processing;
    for at least one third party, storing a set of party-specific rules in the memory;
    associating the received report with the corresponding third party; and
    associating at least one fourth party with the sender and with at least one of the third parties;
    in which:
        the third party is an agency that communicates with the central computer system using an agency computer system;
        the fourth party is a client of the agency and communicates with the central bomputer system using a client computer system, the agency and client being contractually related entities;
        the sender is a person referred by the agency to the client and performs work tasks for the client;
        the at least one parameter includes time worked by the sender on behalf of the client; and
    further comprising, within the central computer system:
        via a publicly accessible transmission network, receiving access requests from the agency and the client sent through their respective computer systems for portions of the extracted report data defined according to the respective party-specific rules, and responding to the access requests by returning the requested report data to the agency and client, respectively, including automatically, that is, independent of any required human intervention, completing any requests for interactive and iterative review, modification or annotation, inclusive, of the report data by the agency and client according to each party's respective party-specific rules, whereby the central computer system is an intermediary system between the sender on the one hand and the agency and client on the other hand and exposes different interfaces to the sender, agency and client;
        converting the extracted report data into a format specified by the rules associated with that third party, whereby third parties operating different hardware platforms and processing software may receive and process extracted report data from the same memory within the central computer system; and
        transferring a copy of the extracted report data to the third party via the network, whereby the transferred data resides at and is available for processing by the third party.

2. A method as in claim 1, further comprising the following steps:
    storing the extracted report data in the memory in a predetermined common format;
    before transferring the extracted report data to any third party, converting the extracted data into a format specified by the rules associated with that third party, whereby third parties operating different hardware platforms and processing soft are may receive and process extracted report data from the same memory within the central computer system.

3. A method as in claim 1, further comprising the step of storing in the memoly third-party indicated annotations associated with the extracted report data.

4. A method as in claim 1, further comprising the following steps:
    receiving, from the third party, a confirmation or rejection indication relating to at least a portion of the extracted, stored report data; and
    upon receipt of the rejection indication, directing the sender to resubmit a corrected report.

5. A method as in claim 1,further comprising the following steps:
    storing an image of the report as received; and
    via the network, allowing access by the third party to the image, whereby the third party is able to confirm the accuracy of the extracted report data.

* * * * *